United States Patent
Li et al.

(10) Patent No.: US 10,165,235 B2
(45) Date of Patent: Dec. 25, 2018

(54) DIGITAL MICROMIRROR DEVICE CONTROL APPARATUS AND PROJECTION DISPLAY SYSTEM

(71) Applicant: APPOTRONICS CORPORATION LIMITED, Shenzhen (CN)

(72) Inventors: Yi Li, Shenzhen (CN); Hong Ye, Shenzhen (CN); Min Sun, Shenzhen (CN); Fuyuan Wu, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/327,004

(22) PCT Filed: Jul. 8, 2015

(86) PCT No.: PCT/CN2015/083509
§ 371 (c)(1),
(2) Date: Jan. 17, 2017

(87) PCT Pub. No.: WO2016/008374
PCT Pub. Date: Jan. 21, 2016

(65) Prior Publication Data
US 2017/0155878 A1    Jun. 1, 2017

(30) Foreign Application Priority Data
Jul. 17, 2014    (CN) .......................... 2014 1 0342448

(51) Int. Cl.
*G03B 21/00*    (2006.01)
*H04N 9/31*    (2006.01)
(Continued)

(52) U.S. Cl.
CPC .......... *H04N 9/3126* (2013.01); *G09G 3/002* (2013.01); *G09G 3/346* (2013.01); *G09G 5/003* (2013.01);
(Continued)

(58) Field of Classification Search
CPC .. H04N 9/3126; H04N 9/3105; H04N 9/3161; H04N 9/3114
See application file for complete search history.

(56) References Cited

U.S. PATENT DOCUMENTS

| 5,612,753 A * | 3/1997 | Poradish | H04N 9/3108 |
| | | | 348/743 |
| 2003/0016335 A1* | 1/2003 | Penn | G02B 26/0841 |
| | | | 353/31 |

(Continued)

FOREIGN PATENT DOCUMENTS

| CN | 1677478 A | 10/2005 |
| CN | 101315513 A | 12/2008 |
| JP | 2004138732 A | 5/2004 |

OTHER PUBLICATIONS

The World Intellectual Property Organization (WIPO) International Search Report for PCT/CN2015/083509 dated Sep. 25, 2015 p. 1-5.

*Primary Examiner* — Jefferey F Harold
*Assistant Examiner* — Humam M Satti
(74) *Attorney, Agent, or Firm* — Anova Law Group, PLLC (57) ABSTRACT

The invention provides a digital micromirror device control apparatus and a projection display system. The digital micromirror device control apparatus includes a video decoding circuit configured to decode received video data, thereby obtaining component data signals of a plurality of colors; a digital micromirror device driving circuit including a first sub-driving circuit and a second sub-driving circuit. An input end of the first sub-driving circuit is connected to the video decoding circuit, an output end of the first sub-driving circuit is connected to the first digital micromirror device, an input end of the second sub-driving circuit is connected to the video decoding circuit, and an output end of the second sub-driving circuit is connected to a second digital micromirror device. The first sub-driving circuit and the second sub-driving circuit are configured to process component data signals of at least three of the plurality of colors.

16 Claims, 5 Drawing Sheets

(51) Int. Cl.
    *G09G 3/00*        (2006.01)
    *G09G 3/34*        (2006.01)
    *G09G 5/00*        (2006.01)

(52) U.S. Cl.
    CPC ........... *H04N 9/312* (2013.01); *H04N 9/3105* (2013.01); *H04N 9/3111* (2013.01); *H04N 9/3114* (2013.01); *H04N 9/3161* (2013.01); *H04N 9/3182* (2013.01); *G09G 2360/04* (2013.01)

(56) References Cited

U.S. PATENT DOCUMENTS

| | | | |
|---|---|---|---|
| 2009/0219488 A1* | 9/2009 | Dufour | G02B 27/1026 353/20 |
| 2013/0100181 A1* | 4/2013 | Choe | G03H 1/2294 345/691 |
| 2013/0286158 A1* | 10/2013 | Chiu | G02B 27/2264 348/43 |
| 2016/0119595 A1* | 4/2016 | Lyubarsky | G02B 27/0961 353/20 |
| 2017/0048501 A1* | 2/2017 | Li | G02B 27/10 |
| 2017/0048502 A1* | 2/2017 | Guo | F21V 9/10 |
| 2017/0371248 A1* | 12/2017 | Tang | G02B 21/0076 |

\* cited by examiner

DIGITAL MICROMIRROR DEVICE CONTROL APPARATUS AND PROJECTION DISPLAY SYSTEM

CROSS-REFERENCES TO RELATED APPLICATIONS

This patent application is a national phase entry under 35 U.S.C. § 371 of international Application No. PCT/CN2015/083509, filed on Jul. 8, 2015, which claims priority to Chinese patent application No. 201410342448.1 filed on Jul. 17, 2014, the entire content of all of which is incorporated herein by, reference.

FIELD OF THE DISCLOSURE

The present disclosure generally relates to the field of electronic technology and, more particularly, relates to a digital micromirror device control apparatus and a projection display system.

BACKGROUND

Figure 1:
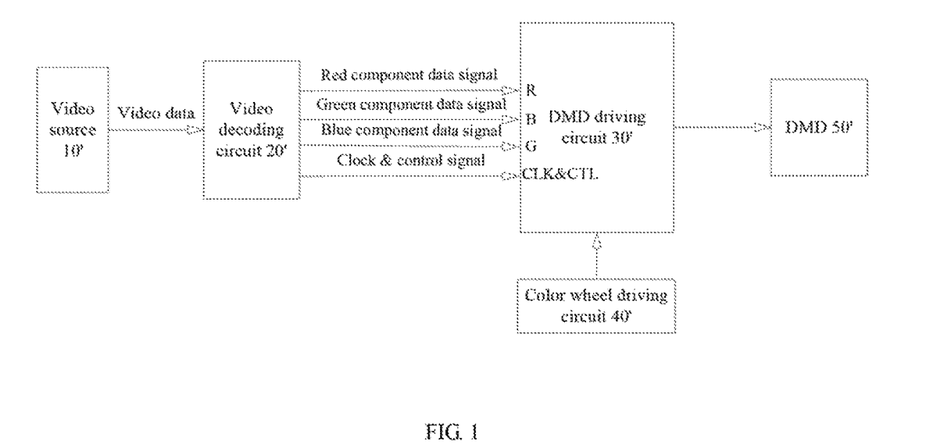
FIG. 1 illustrates a schematic view of a projection display system according to exiting techniques.

Currently, a projection display system based on the digital light processing (DLP) technologies is often a projection display system using a single digital micromirror device (DMD), if a single DMD is used, the light source utilization efficiency can be low. A single-DMD projection display system is shown in FIG. 1, where 10' is a video source, 20' is a video decoding circuit, 30' is a DMD driving circuit, 40' is a color wheel driving circuit, and 50' is a DMD.

The operation process of the single-DMD projection display system is: the video source 10' outputs video data, and the video decoding circuit 20' decodes the video data into three color component data of red (R), green (G), blue (B), which is then outputted to the DMD driving circuit 30'. The DMD driving circuit 30' has three channels including a red data channel (R channel), a blue data channel (B channel), and a green data channel (G channel), as well as a clock & control data channel (CLK&CTL channel). The R channel receives a red component data signal, the B channel receives a blue component data signal, the G channel receives a green component data signal, and the CLK&CTL channel receives a clock & control signal. Based on a color wheel feedback signal of the color wheel driving circuit 40', the DMD driving circuit 30' time-sparingly outputs component data of red, green, blue, etc. to the DMD 50' for display according to a specific timing sequence. In the projection system, for the DMD, an average display time of one color may only be one third of a unit of time. Accordingly, the efficiency for displaying images using the projection display system is low, resulting in a relatively low image brightness.

Currently, there is no effective solution yet to solve the low efficiency issue in displaying images using the existing projection display system.

BRIEF SUMMARY OF THE DISCLOSURE

The main object of the present disclosure is to provide a digital micromirror device control apparatus and a projection display system, thereby solving the low efficiency issue in displaying images using the projection display system.

To achieve the aforementioned object, according to one aspect of the present disclosure, a digital micromirror device control apparatus is provided. The digital micromirror device control apparatus according to the present disclosure includes: a video decoding circuit configured to decode received video data, thereby obtaining component data signals of a plurality of colors; and a digital micromirror device (DMD) driving circuit, where the digital micromirror device driving circuit includes a first sub-driving circuit and a second sub-driving circuit. An input end of the first sub-driving circuit is connected to the video decoding circuit, and an output end of the first sub-driving circuit is connected to a first digital micromirror device. An input end of the second sub-driving circuit is connected to the video decoding circuit, and an output end of the second sub-driving circuit is connected to a second digital micromirror device. The first sub-driving circuit and the second sub-driving circuit are configured to process component data signals of at least three of the plurality of colors. The first sub-driving circuit is configured to control the first digital micromirror device to modulate the received component data signals, and the second sub-driving circuit is configured to control the second digital micromirror device to modulate received component data signals.

Further, the component data signals received by the first sub-driving circuit include component data signals of at least two of the plurality of colors. The first sub-driving circuit is configured to control the first digital micromirror device to modulate the component data signals of the at least two colors.

Further, the digital micromirror device control apparatus also includes a color wheel driving circuit connected to the first sub-driving circuit and the second sub-driving circuit, respectively, and configured to output a color wheel feedback signal to the first sub-driving circuit and the second sub-driving circuit. The first sub-driving circuit and the second sub-driving circuit synchronously drive the first digital micromirror device and the second digital micromirror device according to the color wheel feedback signal.

Further, the video decoding circuit includes: a first signal output end configured to output the component data signal of a first color; a second signal output end configured to output the component data signal of a second color; a third signal output end configured to output the component, data signal of a third color. The first sub-driving circuit includes: a first receiving end connected to the first signal output end and configured to receive the component data signal of the first color; a second receiving end connected to the first signal output end and configured to receive the component data signal of the first color; and a third receiving end connected to the second signal output end and configured to receive the component data signal of the second color. The second sub-driving circuit includes: a fourth receiving end connected to the third signal output end and configured to receive the component data signal of the third color; and a fifth receiving end connected to the third signal output end and configured to receive the component data signal of the third color.

Further, the second sub-driving circuit also includes a sixth receiving end, where the sixth receiving end is connected to the second signal output end and configured to receive the component data signal of the second color. Or, the sixth receiving end is connected to ground.

Further, the video decoding circuit also includes: a fourth signal output end configured to output the component data signal of a fourth color. The second sub-driving circuit also includes a sixth receiving end connected to the fourth signal output end and configured to receive the component data signal of the fourth color.

Further, the second sub-driving circuit also includes a sixth receiving end connected to the third signal output end and configured to receive the component data signal of the third color.

Further, the digital micromirror device control apparatus also includes a light-emitting diode driving module connected to the first sub-driving circuit and configured to receive a light-emitting diode driving signal outputted by the first sub-driving circuit, where the light-emitting diode driving signal is configured to drive the light-emitting diode driving module. Or, the digital micromirror device control apparatus also includes a laser diode driving module connected to the first sub-driving circuit and configured to receive a laser diode driving signal outputted by the first sub-driving circuit, where the laser diode driving signal is configured to drive the laser diode driving module.

Further, the first color may be green, the second color may be blue, and the third color may be red.

To achieve the aforementioned object, according to another aspect of the present disclosure, a projection display system is provided. The project display system according to the present disclosure includes: a video source configured to output video data; a digital micromirror device, where the digital micromirror device includes a first digital micromirror device and a second digital micromirror device; and the aforementioned digital micromirror device control apparatus, where the digital micromirror device control apparatus includes a video decoding circuit and a digital micromirror device driving circuit. The video decoding circuit is connected to the video source, the digital micromirror device control apparatus is connected to the first micromirror device and the second digital micromirror device, respectively. The digital micromirror device control apparatus is configured to receive video data from the video source and control the first digital micromirror device and the second digital micromirror device to modulate the video data.

According to embodiments of the present disclosure, the DMD driving circuit including the first sub-driving circuit and the second sub-driving circuit may be used to control two DMDs for display. The component data signals of at least three colors are processed via two sub-driving circuits. Compared to the existing projection display system using a single DMD for display, the low efficiency issue in displaying images may be solved, and an effect of improving the image displaying efficiency of the projection display system may be achieved.

BRIEF DESCRIPTION OF THE DRAWINGS

Accompanying drawings constituting a part of the present disclosure are intended to provide a further understating of the present disclosure. Exemplary embodiments of the present disclosure and descriptions thereof are directed to illustrate the present disclosure, but do not constitute an inappropriate limitation on the present disclosure. In the accompanying drawings.

DETAILED DESCRIPTION

It should be noted that, if no conflict is generated, embodiments of the present disclosure and features of the embodiments may be combined with each other. Hereinafter, the present disclosure will be described in detail with reference to the accompanying drawings taken in conjunction with embodiments.

For those skilled in the art to better understand solutions of the present disclosure, technical solutions in the embodiments of the present disclosure will be described as follows in a clear and complete manner with reference to the accompanying drawings in the embodiments of the present disclosure. Obviously, the embodiments described below are merely a part of, rather than entire, embodiments of the present disclosure. On the basis of the embodiments of the present disclosure, all other embodiments obtainable by those ordinarily skilled in the art without creative effort shall fall within the protection scope of the present disclosure.

It should be noted that, terms such as "first" and "second" in specification and claims as well as aforementioned accompanying drawings of the present disclosure are intended to distinguish similar objects, but do not denote any order or precedence. It should be understood that the terms so used are interchangeable under appropriate circumstances for ease of description to describe embodiments of the present disclosure herein. Additionally, the terms "including", "comprising", or any variation thereof are intended to cover a non-exclusive inclusion, for example, a system, product or device comprises a list of elements does not necessarily include only those clearly listed elements, but may include other elements not expressly listed or inherent to such system, product or device.

Embodiments of the present disclosure provide a digital micromirror device control apparatus.

Figure 2:
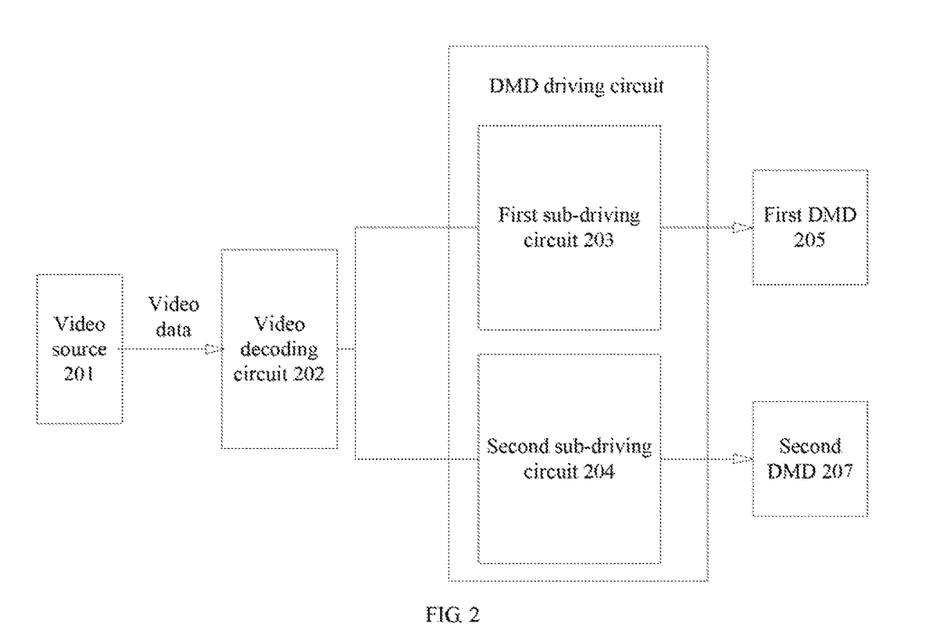
FIG. 2 illustrates a schematic view of a digital micromirror device control apparatus according to embodiments of the present disclosure.

FIG. 2 illustrates a schematic view of a digital micromirror device control apparatus according to embodiments of the present disclosure. As shown in FIG. 2, the digital micromirror device control apparatus includes a video decoding circuit 202 and a digital micromirror device (DMD) driving circuit.

The video decoding circuit 202 is configured to perform decoding of received video data, thereby obtaining component data signals of a plurality of colors.

The video decoding circuit 202 is connected to the video source 201 and configured to receive and decode the video data outputted by the video source 201, thereby obtaining component data signals of a plurality of colors. Each color in the plurality of colors corresponds to one component data signal. For example, the component data signals obtained after decoding may be component data signals of three primary colors divided into a component data signal of red, a component data signal of blue, and a component data signal of green. Obviously, component data signals of colors other than the three primary colors may also be obtained after decoding, such as component data signals of white, yellow or other specific colors. When more component data signals of different colors are decoded, the color saturation of the image display increases.

The digital micromirror device driving circuit includes a first sub-driving circuit 203 and a second sub-driving circuit 204. In particular, an input end of the first sub-driving circuit 203 is connected to the video decoding circuit 202, and an output end of the first sub-driving circuit 203 is connected to a first DMD 205. An input end of the second sub-driving circuit 204 is connected to the video decoding circuit 202, and an output end of the second sub-driving circuit 204 is connected to a second DMD 207. The first sub-driving circuit 203 and the second sub-driving circuit 204 are configured to process the component data signals of at least three of the plurality of colors. In particular, the first sub-driving circuit 203 is configured to control the first DMD 205 to modulate the received component data signal, and the second sub-driving circuit 204 is configured to control the second DMD 207 to modulate the received component data signal. The first DMD refers to the first digital micromirror device, and the second DMD refers to the second digital micromirror device. The first DMD 205 and the second DMD 207 in embodiments of the present disclosure are both configured to modulate the light. That is, component data signals of the plurality of colors obtained after decoding by the video decoding circuit 202 may form light signals having corresponding colors after passing the first sub-driving circuit 203 and the second sub-driving circuit 204, which are then outputted to the DMDs.

The digital micromirror device driving circuit is the DMD driving circuit, and the DMD driving circuit includes two DMD driving circuits, that is, the first sub-driving circuit 203 and the second sub-driving circuit 204. Here, the first sub-driving circuit and the second sub-driving circuit are both DMD driving circuits. That is, the digital micromirror device control apparatus in embodiments of the present disclosure includes two DMD driving circuits configured to drive the two DMDs, namely, the first digital micromirror device 205 and the second digital micromirror device 207.

The first sub-driving circuit 203 and the second sub-driving circuit 204 receive the component data signals of at least three of the plurality of colors decoded by the video decoding circuit 202, and perform corresponding processing of the component data signals of the at least three colors for display on the first digital micromirror device 205 and the second digital micromirror device 207.

Because the first sub-driving circuit 203 and the second sub-driving circuit 204 are configured to process the component data signals of at least three of the plurality of colors, the plurality of colors includes at least three colors such as the three primary colors, or other three or more colors.

According to embodiments of the present disclosure, two driving circuits, such as the first sub-driving circuit and the second sub-driving circuit, are used in the DMD driving circuit to process the component data signals of the at least three colors, such that the display of the component data signals of the at least three colors may be controlled via two DMDs. Compared to the existing projection display system using a single DMD for display, the low efficiency issue in displaying images is solved, and the effect of improving the image displaying efficiency of the projection display system is achieved.

Further, using the DMD driving circuit including the first sub-driving circuit and the second sub-driving circuit to control the display of the two DMDs, the fabrication difficulty of solutions in embodiments of the present disclosure is low and the cost is reduced simultaneously compared to the projection display system wising three or more DMDs.

Preferably, the component data signals received by the first sub-driving circuit include the component data signals of at least two of the plurality of colors. In particular, the first sub-driving circuit is configured to control the first digital micromirror device to modulate the component data signals of the at least two colors.

The component data signals received by the first sub-driving circuit including component data signals of at least two of the plurality of colors means that the first sub-driving circuit processes the component data signals of the at least two colors, and controls the first DMD to modulate the component data signals of the at least two colors. The first sub-driving circuit may process the component data signals of two colors (i.e., green and blue), and the second sub-driving circuit may process the component data signal of red or process the component data signals of two colors including red and another specific color (white, yellow, etc.).

The first sub-driving circuit may control the first DMD to time-sharingly display images of taro colors. Correspondingly, for the first digital micromirror device (DMD), the average display time of one color is only half of a unit of time. However, for the single-DMD projection display system in existing technologies, the average display time of one color is one third of a unit of time. Accordingly, the efficiency of the projection display system according to embodiments of the present disclosure is significantly higher than that of the single-DMD projection display system.

Preferably, the digital micromirror device control apparatus also includes: a color wheel driving circuit connected to the first sub-driving circuit and the second sub-driving circuit, respectively, and configured to output a color wheel feedback signal to the first sub-driving circuit and the second sub-driving circuit. The first sub-driving circuit and the second sub-driving circuit may synchronously drive the first digital micromirror device and the second digital micromirror device according to the color wheel feedback signal.

The color wheel driving circuit outputs the color wheel feedback signal to the first sub-driving circuit and the second sub-driving circuit simultaneously, thereby ensuring that data outputted to the DMDs by the digital micromirror device (DMD) driving circuit is synchronized.

Preferably, the video decoding circuit includes: a first signal output end configured to output a component data signal of a first color; a second signal output end configured to output a component data signal of a second color; and a third signal output end configured to output a component data signal of a third color.

The first color, the second color and the third color may represent corresponding colors among the three primary colors, such as green, blue, and red. The video decoding circuit performs decoding, of the video data received from the video source to obtain the component data signal of the first color, the component data signal of the second color, and the component data signal of the third color, which are outputted via the first signal output end, the second signal output end, and the third signal output end.

The first sub-driving circuit includes: a first receiving end connected to the first signal output end and configured to receive the component data signal of the first color; a second receiving end connected to the first signal output end and configured to receive the component data signal of the first color; a third receiving end connected to the second signal output end and configured to receive the component data signal of the second color. The second sub-driving circuit includes a fourth receiving end connected to the third signal output end and configured to receive the component data signal of the third color; and a fifth receiving end connected to the third signal output end and configured to receive the component data signal of the third color.

The first receiving end, the second receiving end, and the third receiving end of the first sub-driving circuit may represent a receiving end of a R channel, a receiving end of a G channel, and a receiving end of a B channel of the first sub-driving circuit, respectively. In particular, the first receiving end and the second receiving end are connected to the first signal output end of the video decoding circuit and configured to receive the component data signal of the first color, and the third receiving end is configured to receive the component data signal of the second color. The fourth receiving end and the fifth receiving end of the second sub-driving circuit are connected to the third receiving end of the video decoding circuit, respectively, and configured to receive the component data signal of the third color.

Further, the second driving circuit also includes a sixth receiving end. In particular, the sixth receiving end is connected to the second signal output end and configured to receive the component data signal of the second color. Or, the sixth receiving end is connected to around.

Figure 3:
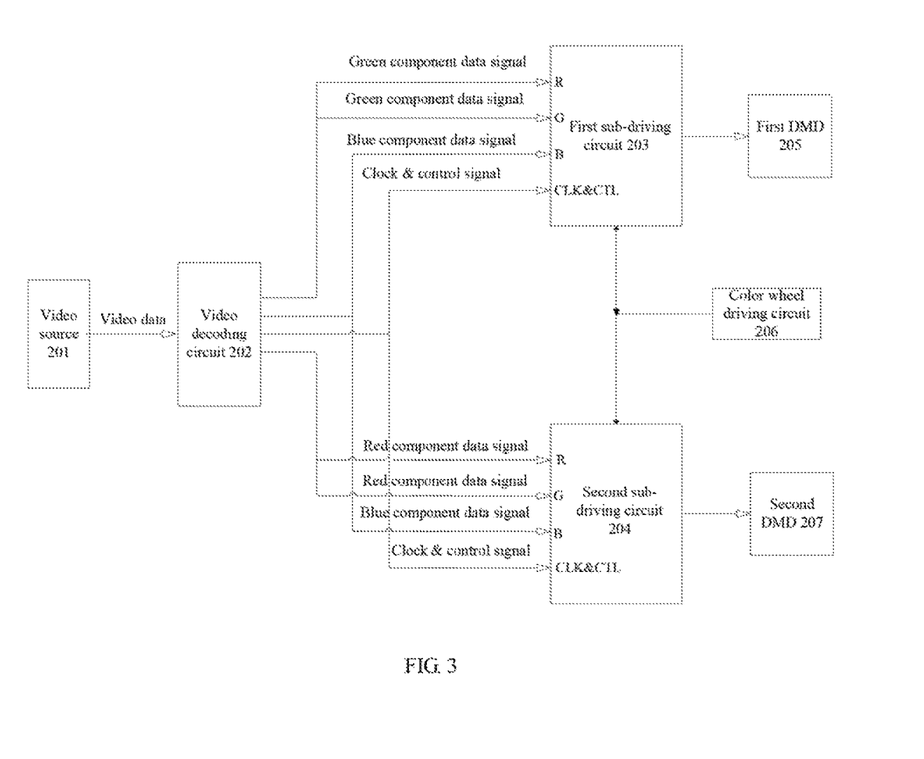
FIG. 3 illustrates a schematic view of a digital micromirror device control apparatus according to preferred embodiments of the present disclosure.

Specifically, an embodiment showing the sixth receiving end being connected to the second signal output end and configured to receive the component data signal of the second color is illustrated in FIG. 3. The video source 201 outputs the video data to the video decoding circuit 202. The video decoding circuit 202 may decode the video data into the component data signal of red, the component data signal of green, the component data signal of blue, and the clock & control signal. In particular, the component data signal of green is the component data signal of the first color, the component data signal of blue is the component data signal of the second color, and the component data signal of green is the component data signal of the third color. The R channel of the first sub-driving circuit 203 is the first receiving end to receive the component data signal of green, the G channel is the second receiving end to receive the component data signal of green, and the B channel is the third receiving end to receive the component data signal of blue. The R channel of the second sub-driving circuit is the fourth receiving end to receive the component data signal of red, the G channel is the fifth receiving end to receive the component data signal of red, and the B channel is the sixth receiving end to receive the component data signal of blue. The first sub-driving signal may time-sharingly display the received component data signal of green and the component data signal of blue via the first digital micromirror device (DMD) 205 according to a specific timing sequence. The second sub-driving circuit 204 may time-sharingly display the received component data signal of red and the component data signal of blue via the second digital micromirror device (DMD) 207 according to a specific timing sequence. The color wheel driving circuit 206 may output the color wheel feedback signal to the first sub-driving circuit 203 and the second sub-driving circuit 204 simultaneously, thereby ensuring that the data outputted to the DMD by the first sub-driving circuit 203 and the second sub-driving circuit 204 is synchronized.

Using the dual-DMD control system in FIG. 3, the display of the two DMDs may be controlled. Each DMD only time-sharingly displays images of two colors. For the digital micromirror device (DMD) the average display time of one color is half of a unite of time. However, for the single-DMD projection display system the average display time of one color is one third of a unit of time. Accordingly, the efficiency of the disclosed system is significantly improved compared to the single-DMD projection display system.

Figure 4:
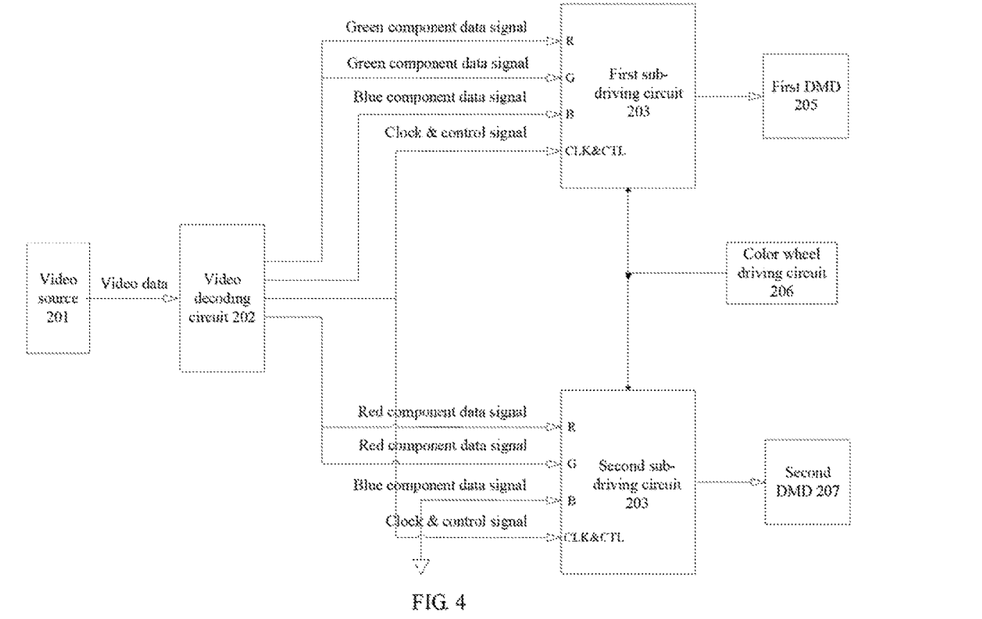
FIG. 4 illustrates a schematic view of a digital micromirror device control apparatus according to an optional embodiment of the present disclosure.

An embodiment showing the sixth receiving end of the second sub-driving circuit being connected to ground is illustrated in FIG. 4, and the embodiment in FIG. 4 differs from the embodiment illustrated in FIG. 3 in that, instead of accessing the component data signal of blue, the B channel of the second sub-driving circuit is connected to ground. Accordingly, for a system where no blue light radiates the second digital micromirror device (DMD) 207, the optical and systematic complexity may be reduced, and the cost of the product may be lowered.

Optionally, the video decoding circuit also includes: a fourth signal output end configured to output the component data signal of the fourth color. The second sub-driving circuit also includes a sixth receiving end connected to the fourth signal output end and configured to receive the component data signal of the fourth color.

The component data signal of the fourth color may be a data signal of a specific color such as white, yellow, red, and blue, etc., obtained by decoding the video data.

Figure 5:
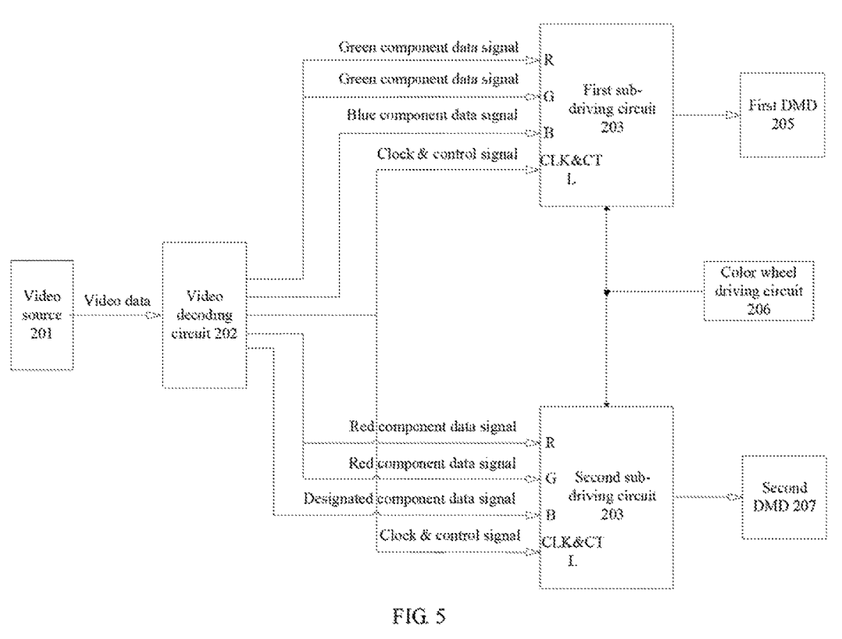
FIG. 5 illustrates a schematic view of a digital micromirror device control apparatus according to another optional embodiment of the present disclosure.

Specifically, as shown in FIG. 5, the disclosed control apparatus differs from the control apparatus illustrated in FIG. 3 in that the B channel of the second sub-driving circuit 204 may access a component data signal of a specific color (e.g., white, red, and blue). The component data signal of a specific color may be decoded and outputted by the video decoding circuit 202, and may improve the image brightness in cooperation of the optical portion. For example, when the component data signal of the specific color is a component data signal of white, compared to the component data signal of blue, the brightness of the images displayed on the second DMD 207 may be improved.

According to embodiments of the present disclosure, the component data signal of the fourth color may be obtained via decoding by the video decoding circuit and be outputted to the sixth receiving end of the second sub-driving circuit. The second DMD may modulate the data component signals. In particular, the first color, the second color and the third color may be three primary colors, and the fourth color may be a specific color such as white, red or yellow. When more component data signals of different colors are decoded, the color saturation of the displayed images is higher. Accordingly, by using the component data signal of the fourth color, the brightness of the images displayed via the second sub-driving circuit may be significantly improved.

Preferably, the second sub-driving circuit may also include the sixth receiving end connected to the third signal output end and configured to receive the component data signal of the third color.

The fourth receiving end, the fifth receiving end, and the sixth receiving end of the second sub-driving circuit are all connected to the third signal output end of the video decoding circuit, and all configured to receive the component data signal of the third color.

Figure 6:
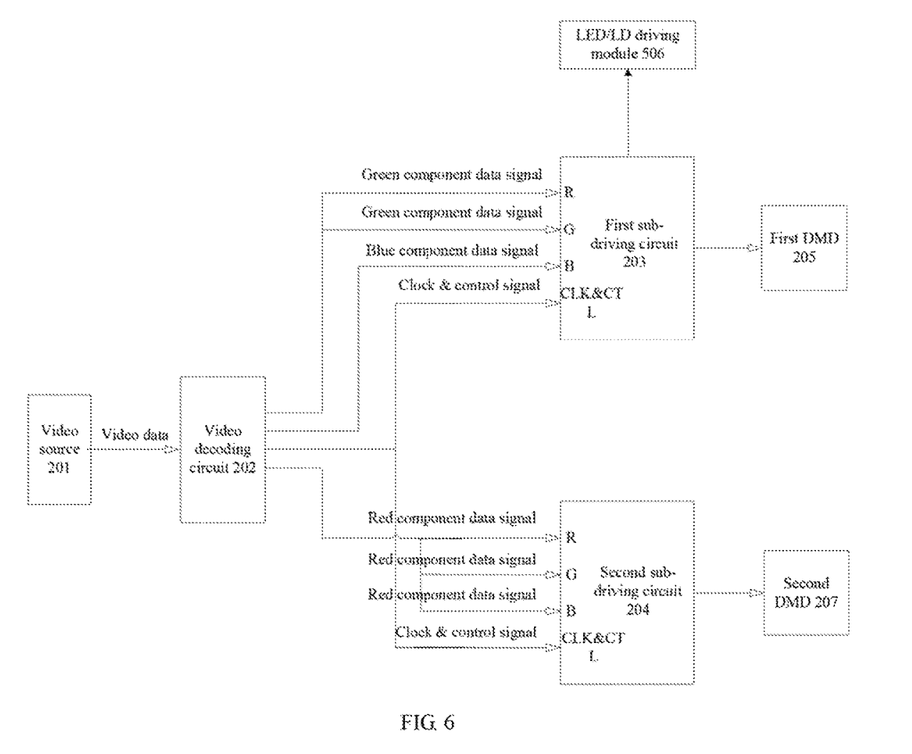
FIG. 6 illustrates a schematic view of a digital micromirror device control apparatus according to another preferred embodiment of the present disclosure.

Specifically, as shown in FIG. 6, the video source 201 outputs the video data to the video decoding circuit 202. The video decoding circuit 202 may decode the video data into a component data signal of red, a component data signal of green, a component data signal of blue, and a clock & control signal. The R channel of the first sub-driving circuit 203 is the first receiving end to receive the component data signal of green, the G channel is the second receiving end also to receive the component data signal of green, and the B channel is the third receiving end to receive the component data signal of blue. The R channel (the fourth receiving end), the G channel (the fifth receiving end), and the B channel (the sixth receiving end) of the second sub-driving circuit 204 all receive the component data signal of red. The first sub-driving circuit 203 may time-sharingly display the received component data signal of green and the component data signal of blue via the first digital micromirror device (DMD) according to a specific timing sequence. Simultaneously, according to the displaying sequence of the colors on DMD, green and blue images may be displayed time-sharingly via the first digital micromirror device (DMD) 205 and only red images may be displayed via the second digital micron device (DMD) 207. The lights reflected by the two DMDs and display full-color images on a screen via spatial light combination.

Further, the digital micromirror device control apparatus also includes: a light-emitting diode driving module connected to the first sub-driving circuit and configured to receive a light-emitting diode driving signal outputted by the first sub-driving circuit, where the light-emitting diode driving signal is configured to drive the light-emitting diode driving module. Or, the digital micromirror device control apparatus also includes a leases diode driving module connected to the first sub-driving circuit and configured to receive the laser diode driving signal outputted b the first sub-driving circuit, where the laser diode driving signal is configured to drive the laser diode driving module.

As shown in FIG. 6, the first sub-driving circuit 203 drives the light-emitting diode (LED) driving module or the laser diode (LD) driving module, such that the LED or LD may emit light. The second sub-driving circuit transmits the received component data signal of red to the second mirror device (DMD) 207, thereby displaying red images. Green and blue images may be displayed time-sharingly via the first digital micromirror device (DMD) 205, and only red images may be displayed via the second digital micromirror device (DMD) 207. The lights reflected by the two DMDs may display full-color images on the screen via light combination in the space. The disclosed control apparatus may realize a two-DMD projection display system by using the LED light source or the LD light source.

Preferably, in embodiments of the present disclosure, the first color is green, the second color is blue, and the third color is red.

Embodiments of the present disclosure also provide a projection display system. The projection display system may use the digital micromirror device control apparatus in embodiments of the present disclosure, and the digital micromirror device control apparatus in embodiments of the present disclosure may be applied to the projection display system in embodiments of the present disclosure.

The projection display system in embodiments of the present disclosure includes: a video source configured to output video data; a digital micromirror device, where the digital micromirror device includes a first digital micromirror device and a second digital micromirror devices; a digital micromirror device control apparatus, where the digital micromirror device control apparatus includes a video decoding circuit and a digital micromirror device driving circuit. The video decoding circuit is connected to the video source, the digital micromirror device driving circuit is connected to the first digital micromirror device and the second digital micromirror device, respectively. The digital micromirror device control apparatus is configured to receive the video data from the video source, and control the first digital micromirror device and the second digital micromirror device to modulate the video data.

In particular, the digital micromirror device control apparatus is the digital micromirror device control apparatus provided by embodiments of the present disclosure. The digital micromirror device driving circuit includes the first sub-driving circuit and the second sub-driving circuit, which are configured to drive the first DMD and the second DMD, respectively.

According to embodiments of the present disclosure, the DMD driving circuit is used to control the display of two DMDs, and two driving circuits are used to process component data signals of at least three colors. Compared to the existing projection display system using a single DMD for display, the low efficiency issue in displaying images is solved, and an effect of improving the image displaying efficiency of the projection display system is achieved.

Aforementioned descriptions are only preferred embodiments of the present disclosure, but are not intended to limit the present disclosure. For those skilled in the art, various alterations and variations can be made in the present disclosure. Without departing from the spirit and scope of the present disclosure, any modifications, equivalent replacements, and improvements, etc. shall fall within the protection scope of the present disclosure.

What is claimed is:

1. A digital micromirror device control apparatus, comprising:
    a video decoding circuit, configured to decode received video data, thereby obtaining component data signals of a plurality of colors;
    a plurality of digital micromirror devices including a first digital micromirror device and a second digital micromirror device; and
    a digital micromirror device driving circuit, including a first sub-driving circuit and a second sub-driving circuit, to drive the plurality of digital micromirror devices, wherein:
    an input end of the first sub-driving circuit is connected to the video decoding circuit,
    an output end of the first sub-driving circuit is connected to the first digital micromirror device,
    an input end of the second sub-driving circuit is connected to the video decoding circuit,
    an output end of the second sub-driving circuit is connected to the second digital micromirror device, and
    the first sub-driving circuit and the second sub-driving circuit are configured to process component digital signals of at least three of the plurality of colors,
    wherein the first sub-driving circuit is configured to control the first digital micromirror device to modulate received component digital signals of a first number of the plurality of colors, and the second sub-driving circuit is configured to control the second digital micromirror device to modulate received component data signals of a second number of the plurality of colors, different from the first number of the plurality of colors;
    the video decoding circuit includes a first signal output end configured to output a component data signal of a first color, a second signal output end configured to output a component data signal of a second color, and a third signal output end configured to output a component data signal of a third color;
    the first sub-driving circuit includes a first receiving end connected to the first signal output end and configured to receive the component data signal of the first color, a second receiving end connected to the first signal output end and configured to receive the component data signal of the first color, and a third receiving end connected to the second signal output end and configured to receive the component data signal of the second color; and the second sub-driving circuit includes a fourth receiving end connected to the third signal output end and configured to receive the component data signal of the third color, and a fifth receiving end connected to the third signal output end and configured to receive the component data signal of the third color.

2. The digital micromirror device control apparatus according to claim 1, wherein the component data signals received by the first sub-driving circuit include component data signals of at least two of the plurality of colors, wherein the first sub-driving circuit is configured to control the first digital micromirror device to modulate the component data signals of the at least two of the plurality of colors.

3. The digital micromirror device control apparatus according to claim 1, further comprising:
a color wheel driving circuit connected to the first sub-driving circuit and the second sub-driving circuit, respectively, and configured to output a color wheel feedback signal to the first sub-driving circuit and the second sub-driving circuit and to synchronously drive the first digital micromirror device and the second digital micromirror device according to the color wheel feedback signal.

4. The digital micromirror device control apparatus according to claim 1, wherein the second sub-driving circuit further includes a sixth receiving end,
the sixth receiving end is connected to the second signal output end and configured to receive the component data signal of the second color; or
the sixth receiving end is connected to ground.

5. The digital micromirror device control apparatus according to claim 1, wherein:
the video decoding circuit further includes a fourth signal output end configured to output a component data signal of a fourth color; and
the second sub-driving circuit further includes a sixth receiving end connected to the fourth signal output end and configured to receive the component data signal of the fourth color.

6. The digital micromirror device control apparatus according to claim 1, wherein:
the second sub-driving circuit further includes a sixth receiving end connected to the third signal output end and configured to receive the component data signal of the third color.

7. The digital micromirror device control apparatus according to claim 6, further comprising:
a light-emitting diode driving module connected to the first sub-driving circuit and configured to receive a light-emitting diode driving signal outputted by the first sub-driving circuit, the light-emitting diode driving signal being configured to drive the light-emitting diode driving module; or
a laser diode driving module connected to the first sub-driving circuit and configured to receive a laser diode driving signal outputted by the first sub-driving circuit, the laser diode driving signal being configured to drive the laser diode driving module.

8. The digital micromirror device control apparatus according to claim 1, wherein:
the first color is green, the second color is blue, and the third color is red.

9. A projection display system, comprising:
a video source, configured to output video data;
a plurality of digital micromirror devices, including a first digital micromirror device and a second digital micromirror device; and a digital micromirror device control apparatus including:
a video decoding circuit, connected to the video source to receive and decode the video data to obtain component data signals of a plurality of colors, and
a digital micromirror device driving circuit including:
a first sub-driving circuit having: an input end connected to the video decoding circuit and an output end connected to the first digital micromirror device, and
a second sub-driving circuit having: an input end connected to the video decoding circuit and an output end connected to the second digital micromirror device, respectively,
the digital micromirror device control apparatus being configured to receive the video data from the video decoding circuit and control the first digital micromirror device and the second digital micromirror device to modulate the video data,
wherein the first sub-driving circuit and the second sub-driving circuit are configured to process component digital signals of at least three of the plurality of colors,
the first sub-driving circuit is configured to control the first digital micromirror device to modulate received component digital signals of a first number of the plurality of colors, and the second sub-driving circuit is configured to control the second digital micromirror device to modulate received component data signals of a second number of the plurality of colors, different from the first number of the plurality of colors,
the video decoding circuit includes a first signal output end configured to output a component data signal of a first color, a second signal output end configured to output a component data signal of a second color, and a third signal output end configured to output a component data signal of a third color,
the first sub-driving circuit includes a first receiving end connected to the first signal output end and configured to receive the component data signal of the first color, a second receiving end connected to the first signal output end and configured to receive the component data signal of the first color, and a third receiving end connected to the second signal output end and configured to receive the component data signal of the second color, and
the second sub-driving circuit includes a fourth receiving end connected to the third signal output end and configured to receive the component data signal of the third color, and a fifth receiving end connected to the third signal output end and configured to receive the component data signal of the third color.

10. The projection display system according to claim 9, wherein:
the component data signals received by the first sub-driving circuit include component data signals of at least two of the plurality of colors,
the first sub-driving circuit is configured to control the first digital micromirror device to modulate the component data signals of the at least two of the plurality of colors.

11. The projection display system according to claim 9, wherein the digital micromirror device control apparatus further comprises:
a color wheel driving circuit connected to the first sub-driving circuit and the second sub-driving circuit, respectively, and configured to output a color wheel feedback signal to the first sub-driving circuit and the second sub-driving circuit and to synchronously drive the first digital micromirror device and the second digital micromirror device according to the color wheel feedback signal.

12. The projection display system according to claim 9, wherein:
the second sub-driving circuit further includes a sixth receiving end,
the sixth receiving end is connected to the second signal output end and configured to receive the component data signal of the second color; or
the sixth receiving end is connected to ground.

13. The projection display system according to claim 9, wherein:
the video decoding circuit further includes a fourth signal output end configured to output a component data signal of a fourth color; and
the second sub-driving circuit further includes a sixth receiving end connected to the fourth signal output end and configured to receive the component data signal of the fourth color.

14. The projection display system according to claim 9, wherein:
the second sub-driving circuit further includes a sixth receiving end connected to the third signal output end and configured to receive the component data signal of the third color.

15. The projection display system according to claim 14, wherein the digital micromirror device control apparatus further comprises:
a light-emitting diode driving module connected to the first sub-driving circuit and configured to receive a light-emitting diode driving signal outputted by the first sub-driving circuit, the light-emitting diode driving signal being configured to drive the light-emitting diode driving module; or
a laser diode driving module connected to the first sub-driving circuit and configured to receive a laser diode driving signal outputted by the first sub-driving circuit, the laser diode driving signal being configured to drive the laser diode driving module.

16. The projection display system according to claim 9, wherein:
the first color is green, the second color is blue, and the third color is red.

* * * * *